United States Patent
Kuwabara et al.

(10) Patent No.: US 11,427,247 B2
(45) Date of Patent: Aug. 30, 2022

(54) STEERING DETERMINATION DEVICE AND AUTONOMOUS DRIVING SYSTEM

(71) Applicants: TOYOTA JIDOSHA KABUSHIKI KAISHA, Toyota (JP); JTEKT Corporation, Osaka (JP)

(72) Inventors: Takahiko Kuwabara, Yokohama (JP); Naoki Nishimura, Nagoya (JP); Yoji Kunihiro, Susono (JP); Takahiro Kojo, Gotemba (JP); Hisaya Akatsuka, Susono (JP); Maxime Moreillon, Nara (JP); Tsutomu Tamura, Nara (JP); Robert Fuchs, Nara (JP)

(73) Assignees: TOYOTA JIDOSHA KABUSHIKI KAISHA, Toyota (JP); JTEKT Corporation, Osaka (JP)

( * ) Notice: Subject to any disclaimer, the term of this patent is extended or adjusted under 35 U.S.C. 154(b) by 360 days.

(21) Appl. No.: 16/666,991

(22) Filed: Oct. 29, 2019

(65) Prior Publication Data
US 2020/0172159 A1 Jun. 4, 2020

(30) Foreign Application Priority Data
Nov. 30, 2018 (JP) .............................. JP2018-225340

(51) Int. Cl.
*B62D 6/00* (2006.01)
*G05D 1/02* (2020.01)
(Continued)

(52) U.S. Cl.
CPC ............... *B62D 6/00* (2013.01); *G01L 5/221* (2013.01); *G01P 15/18* (2013.01); *G05D 1/021* (2013.01);
(Continued)

(58) Field of Classification Search
CPC ............ B62D 5/06; B62D 1/28; B62D 1/286; B62D 15/029; B62D 6/00; G01L 5/20;
(Continued)

(56) References Cited

U.S. PATENT DOCUMENTS

| 4,763,262 | A | * | 8/1988 | Leiber | B60K 28/16 701/84 |
| 9,302,704 | B2 | * | 4/2016 | Ezoe | B62D 6/007 |
| 9,358,884 | B2 | * | 6/2016 | Stares | B60W 50/0097 |

(Continued)

FOREIGN PATENT DOCUMENTS

| DE | 102012215228 B4 * | 3/2018 | ............ B62D 1/286 |
| DE | 102012215305 B4 * | 3/2021 | ............ B60W 50/10 |

(Continued)

OTHER PUBLICATIONS

An abstract of "Reduction of steering effort in the event of EPAS failure using differential braking assisted steering" by D Zhang, B Lin, A Kirli, C Okwudire—SAE International journal of . . . , 2017—JSTOR (Year: 2017).*

(Continued)

*Primary Examiner* — Cuong H Nguyen
(74) *Attorney, Agent, or Firm* — Dinsmore & Shohl LLP

(57) ABSTRACT

A steering determination device determines a steering state in which a driver of a vehicle is steering a steering wheel of the vehicle. The device includes a torque recognition unit configured to recognize a steering torque based on a measurement result of a torque sensor provided on a steering shaft, an acceleration recognition unit configured to recognize longitudinal acceleration or lateral acceleration, a threshold value setting unit configured to set a threshold value for the determination of the steering state, based on the longitudinal acceleration or the lateral acceleration, and a steering determination unit configured to determine that the driver is in the steering state if the steering torque is equal (Continued)

to or greater than the threshold value. The threshold value setting unit is configured to set the threshold value such that the threshold value decreases as an absolute value of the longitudinal acceleration or the lateral acceleration decreases.

5 Claims, 12 Drawing Sheets

(51) Int. Cl.
  *G01L 5/22* (2006.01)
  *G01P 15/18* (2013.01)
  *G01L 5/20* (2006.01)
  *B62D 5/06* (2006.01)
(52) U.S. Cl.
  CPC .............. *B62D 5/06* (2013.01); *G01L 5/20* (2013.01); *G01L 5/22* (2013.01)
(58) Field of Classification Search
  CPC ............ G01L 5/22; G01L 5/221; G01P 15/18; G05D 1/02; G05D 1/021
  USPC ..................................................... 701/23, 41
  See application file for complete search history.

(56) References Cited

U.S. PATENT DOCUMENTS

| | | | | |
|---|---|---|---|---|
| 9,365,111 | B2* | 6/2016 | Stares | B60W 10/119 |
| 9,630,493 | B2* | 4/2017 | Stares | B60W 30/182 |
| 10,392,019 | B2* | 8/2019 | Maeda | B62D 1/286 |
| 10,712,741 | B2* | 7/2020 | Endo | B60W 30/18072 |
| 11,091,194 | B2* | 8/2021 | Nolden | B62D 5/0481 |
| 2005/0267661 | A1* | 12/2005 | Iwazaki | B62D 1/286 |
| | | | | 701/41 |
| 2018/0057009 | A1* | 3/2018 | Maeda | B60W 30/12 |
| 2018/0074492 | A1* | 3/2018 | Yamamoto | B60W 50/14 |

FOREIGN PATENT DOCUMENTS

| | | | | |
|---|---|---|---|---|
| EP | 3659897 | A1 * | 6/2020 | ............... B62D 6/00 |
| JP | 2005-343184 | A | 12/2005 | |
| JP | 2016-159781 | A | 9/2016 | |
| WO | WO-2011021634 | A1 * | 2/2011 | ............ B60W 40/09 |

OTHER PUBLICATIONS

H. Wang, L. Zhao, W. Chen and X. Liang, "Segmented Coordinated Control Based on Active Steering and Differential Braking for Lane Departure Prevention," 2020 4th CAA International Conference on Vehicular Control and Intelligence (CVCI), 2020, pp. 163-168, doi: 10.1109/CVCI51460.2020.9338588 (Year: 2020).*

A. Ferraris, H. d. C. Pinheiro, E. Galanzino, A. G. Airale and M. Carello, "All-Wheel Drive Electric Vehicle Performance Optimization: From Modelling to Subjective Evaluation on a Static Simulator," 2019 Electric Vehicles International Conference (EV), 2019, pp. 1-6, doi: 10.1109/EV.2019.8893027.*

J. Zhang et al., "Adaptive Sliding Mode-Based Lateral Stability Control of Steer-by-Wire Vehicles With Experimental Validations," in IEEE Transactions on Vehicular Technology, vol. 69, No. 9, pp. 9589-9600, Sep. 2020, doi: 10.1109/TVT.2020.3003326.*

M. Dalboni et al., "Nonlinear Model Predictive Control for Integrated Energy-Efficient Torque-Vectoring and Anti-Roll Moment Distribution," in IEEE/ASME Transactions on Mechatronics, vol. 26, No. 3, pp. 1212-1224, Jun. 2021, doi: 10.1109/TMECH.2021. 3073476.*

D. H. S. De Mel, K. A. Stol and A. P. Hu, "An Improved Baseline for Torque Vectoring Controller Comparisons of Four-Wheel-Independent-Drive Electric Vehicles," 2021 3rd International Conference on Electrical, Control and Instrumentation Engineering (ICECIE), 2021, pp. 1-7, doi: 10.1109/ICECIE52348.2021. 9664738.*

* cited by examiner

STEERING DETERMINATION DEVICE AND AUTONOMOUS DRIVING SYSTEM

CROSS-REFERENCE TO RELATED APPLICATION

This application claims the benefit of priority from Japanese Patent Application No. 2018-225340, filed on Nov. 30, 2018, the entire contents of which are incorporated herein by reference.

TECHNICAL FIELD

The present disclosure relates to a steering determination device and an autonomous driving system.

BACKGROUND

In the related art, a driving assistance device is known, in which a priority is given to steering by a driver over steering by a driving assistance control when an amount of steering torque by the driver is equal to or greater than a predetermined threshold value (for example, Japanese Unexamined Patent Publication No. 2005-343184).

SUMMARY

With regard to a control such as a driving assistance, it may be required to determine whether or not a driver is in a steering state in which a steering operation is performed on a steering wheel of a vehicle by the driver. In determining the steering state, if the determination is performed based on whether or not the steering torque of the steering shaft is equal to or greater than a threshold value, although the driver has no intention of steering, the steering state may be erroneously determined due to the influence of traveling of the vehicle, or the like.

In the technical field, it is desirable to appropriately determine the driver's steering state based on the steering torque.

A steering determination device according to an aspect of the present disclosure determines a steering state in which a driver of a vehicle is steering a steering wheel of the vehicle, based on a steering torque of a steering shaft. The steering determination device is configured to include a torque recognition unit configured to recognize the steering torque based on a result of measurement performed by a torque sensor provided on the steering shaft, an acceleration recognition unit configured to recognize longitudinal acceleration in a longitudinal direction of the vehicle or lateral acceleration in a lateral direction of the vehicle based on a result of measurement performed by an accelerator sensor of the vehicle, a threshold value setting unit configured to set a threshold value used for the determination of the steering state, based on the longitudinal acceleration or the lateral acceleration, and a steering determination unit configured to determine that the driver is in the steering state if the steering torque is equal to or greater than the threshold value. The threshold value setting unit is configured to set the threshold value such that the threshold value decreases as an absolute value of the longitudinal acceleration or the lateral acceleration decreases.

According to the steering determination device in an aspect of the present disclosure, the threshold value setting unit sets the threshold value such that the threshold value decreases as an absolute value of the longitudinal acceleration or the lateral acceleration decreases. If the steering torque is equal to or greater than threshold value, the steering determination unit determines that the driver is in the steering state. In this way, for example, despite that the driver does not have an intention to steer, even if the rotation torque of the steering wheel is generated according to the longitudinal acceleration or the lateral acceleration as the steering torque recognized based on the result of measurement performed by the torque sensor, it is possible to appropriately set the steering torque threshold value. As a result thereof, it is possible to appropriately determine the driver's steering state based on the steering torque.

In an embodiment, the threshold value setting unit may be configured to set the threshold value such that the threshold value continuously decreases as the absolute value of the longitudinal acceleration or the lateral acceleration decreases.

In an embodiment, the threshold value setting unit may be configured to set the threshold value such that the threshold value decreases stepwise as the absolute value of the longitudinal acceleration or the lateral acceleration decreases.

In an embodiment, the acceleration recognition unit may be configured to further recognize a vertical acceleration in a vertical direction of the vehicle, and the threshold value setting unit may be configured to set the threshold value such that the threshold value decreases as the absolute value of the longitudinal acceleration or the lateral acceleration decreases if the vertical acceleration does not change. In this case, it is possible to appropriately set the steering torque threshold value in accordance with the fact that the rotation torque decreases as the longitudinal acceleration or the lateral acceleration decreases, while further considering the vertical acceleration.

In an embodiment, the acceleration recognition unit may be configured to recognize the longitudinal acceleration, the lateral acceleration, and a vertical acceleration in a vertical direction of the vehicle, and the threshold value setting unit may be configured to set the threshold value such that the threshold value decreases as an absolute value of the vertical acceleration decreases if the longitudinal acceleration and the lateral acceleration do not change. In this case, it is possible to appropriately set the threshold value corresponding to the fact that the rotation torque decreases as the vertical acceleration decreases when the longitudinal acceleration and the lateral acceleration do not change.

An autonomous driving system according to an aspect of the present disclosure may perform a manual-driving switching control to switch a driving mode from an autonomous driving to a manual-driving based on a steering torque in a vehicle of which the driving mode can be switched between the autonomous driving and the manual-driving. The autonomous driving system may be configured to include the steering determination device described above, and a manual-driving switching unit configured to perform the manual-driving switching control if it is determined by the steering determination unit that the driver is in the steering state during the autonomous driving. According to the autonomous driving system in an aspect of the present disclosure, it is possible to appropriately realize the switching to the manual-driving based on the result of appropriate determination of the driver's steering state based on the steering torque.

As described above, according to various aspects and embodiments of the present disclosure, it is possible to appropriately determine the driver's steering state which is based on the steering torque.

DETAILED DESCRIPTION

Figure 1:
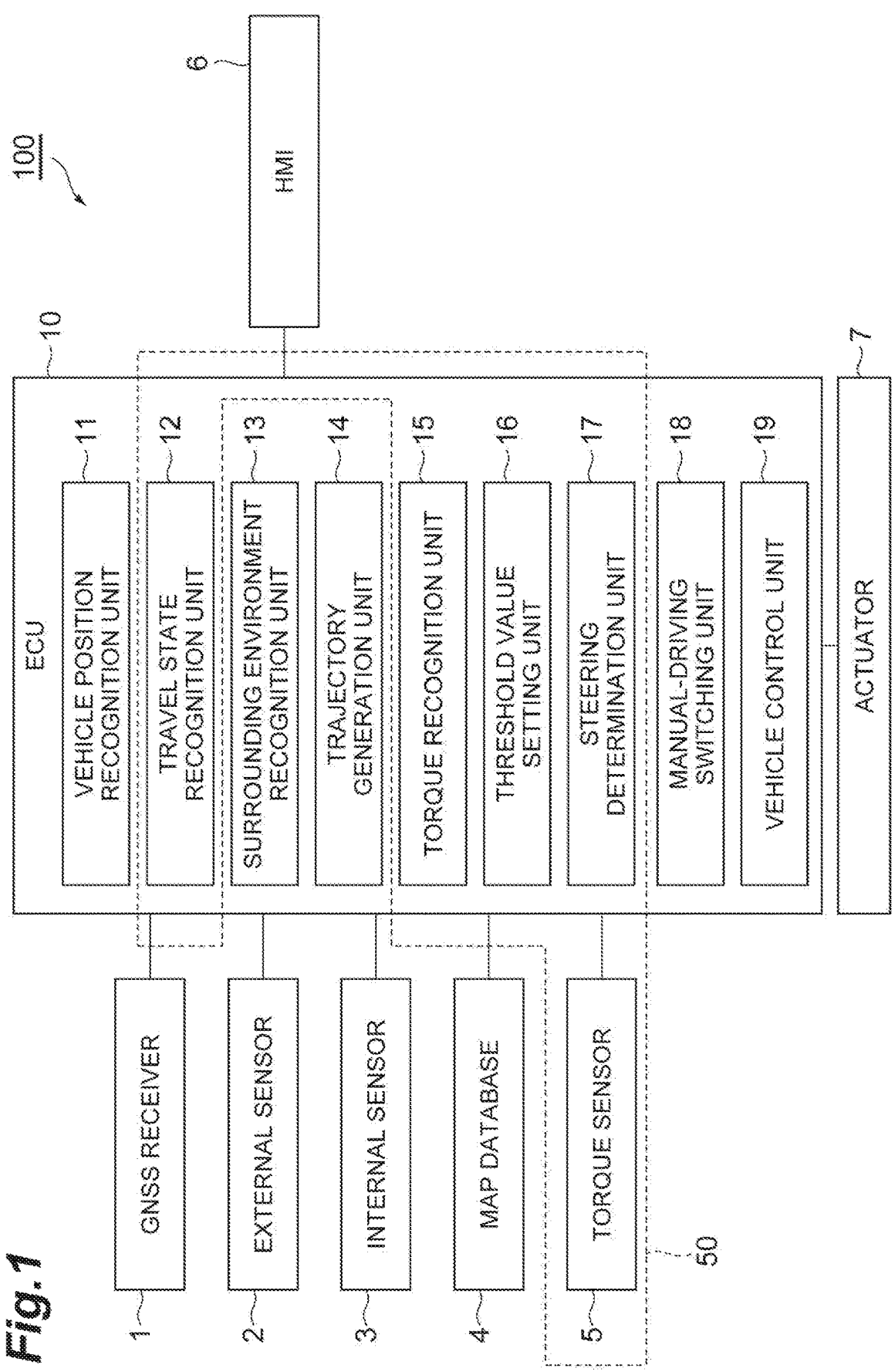
FIG. 1 is a block diagram illustrating an autonomous driving system including a steering determination device according to an embodiment.

Hereinafter, embodiments of the present disclosure will be described with reference to the drawings. In the description below, the same reference numerals will be given to the same or corresponding elements, and the descriptions thereof will not be repeated.

FIG. 1 is a block diagram illustrating an autonomous driving system 100 including a steering determination device 50 according to an embodiment. The autonomous driving system 100 illustrated in FIG. 1 is mounted on a vehicle such as a passenger car and perform is autonomous driving to make the vehicle travel autonomously. The autonomous driving is a vehicle control that makes the vehicle travel to the destination without being operated by a driver. The vehicle is configured to be switchable between the autonomous driving and a manual-driving by the autonomous driving system 100. The manual-driving is a driving state in which the vehicle travels by the driver's driving operation.

The autonomous driving system 100 performs a manual-driving switching control to switch the driving from the autonomous driving to the manual-driving. The manual-driving switching control is a control to switch the driving from the autonomous driving to the manual-driving based on a steering torque recognized based on a result of measurement performed by the torque sensor 5 during the autonomous driving. In the present embodiment, as an example, if the vehicle in autonomous driving approaches a switching location which is a location where the autonomous driving terminates, the autonomous driving system 100 notifies the driver of the vehicle's approach to the switching location and performs the manual-driving switching control based on a steering operation torque by the driver's steering operation (for example, the steering operation for takeover) in response to the notification of the approach. The manual-driving switching control does not necessarily need to be performed when notifying the driver of the vehicle's approach to the switching location.

The steering determination device 50 configures a part of the autonomous driving system 100. The steering determination device 50 determines a driver's steering state of the vehicle based on the steering torque of the steering shaft of the vehicle. The steering state in the present disclosure does not mean a state in which the driver is merely touching the steering wheel, but means a state in which the driver performs the steering operation of the steering wheel. The state in which the driver performs the steering operation means a state in which the steering angle changes due to the steering operation of the steering wheel by the driver, but is not limited thereto, and a state in which the steering angle does not change as a result of temporarily balancing with, for example, a road surface reaction force or the like by the driver's steering operation of the steering wheel may be included. The autonomous driving system 100 performs the manual-driving switching control based on a result of determination performed by the steering determination device 50.

[Configuration of Steering Determination Device 50 and Autonomous Driving System 100]

As illustrated in FIG. 1, the autonomous driving system 100 according to the present embodiment includes an electronic control unit (ECU) 10 that performs an overall vehicle control for the autonomous driving. The ECU 10 is an electronic control unit including a central processing unit (CPU), read only memory (ROM), random access memory (RAM), a controller area network (CAN), and the like. The ECU 10 realizes various functions by, for example, loading the program stored in the ROM into the RAM, and executing the program loaded in the RAM by the CPU. The ECU 10 may be configured with a plurality of electronic control units.

The ECU 10 is connected to a global navigation satellite system (GNSS) receiver 1, an external sensor 2, an internal sensor 3, a map database 4, a torque sensor 5, a human machine interface (HMI) 6, and an actuator 7.

The GNSS receiver 1 measures a position of the vehicle (for example, the latitude and longitude of the vehicle) by receiving signals from three or more GNSS satellites. The GNSS receiver 1 transmits the information on the measured position of the vehicle to the ECU 10.

The external sensor 2 is a detection device that detects a surrounding situation of the vehicle. The external sensor 2 includes at least one of a camera and a radar sensor.

The camera is an imaging device that images a external situation of the vehicle. The camera is provided on the inside of a windshield of the vehicle. The camera transmits the imaging information regarding the external situation of the vehicle to the ECU 10. The camera may be a monocular camera or may be a stereo camera. The stereo camera includes two imaging units arranged to reproduce binocular parallax. The imaging information of the stereo camera also includes information in the depth direction.

The radar sensor is a detection device that detects objects around the vehicle using radio waves (for example, millimeter waves) or light. The radar sensor includes, for example, at least one of the millimeter wave radar or a light detection and ranging (LIDAR). The radar sensor transmits the radio wave or light to the surroundings of the vehicle, and detects obstacles by receiving radio waves or light reflected from the obstacles. The radar sensor transmits the detected obstacle information to the ECU 10.

The internal sensor 3 is a detection device that detects a travel state of the vehicle. The internal sensor 3 includes a vehicle speed sensor, an accelerator sensor, and a yaw rate sensor. The vehicle speed sensor is a measuring device that measures a speed of the vehicle. As the vehicle speed sensor, for example, a vehicle wheel speed sensor is used, which is provided on vehicle wheels of the vehicle or on a drive shaft rotating integrally with vehicle wheels, and measures a rotational speed of the vehicle wheels. The vehicle speed sensor transmits the measured vehicle speed information (vehicle wheel speed information) to the ECU 10.

The accelerator sensor is a measuring device that measures an acceleration of the vehicle. The accelerator sensor includes, for example, a longitudinal accelerator sensor that measures acceleration in the longitudinal direction which is acceleration in the longitudinal direction (forwarding direction) of the vehicle and a lateral accelerator sensor that measures a lateral acceleration which is an acceleration in the lateral direction (horizontal direction) of the vehicle. The accelerator sensor may include a vertical accelerator sensor that measures vertical acceleration, which is acceleration in the vertical direction of the vehicle. The accelerator sensor transmits acceleration information of the vehicle to the ECU 10.

The yaw rate sensor is a measuring device that measures a yaw rate (rotation angular velocity) around the vertical axis at the center of gravity of the vehicle. As the yaw rate sensor, for example, a Gyro sensor can be used. The yaw rate sensor transmits the measured yaw rate information of the vehicle to the ECU 10.

The map database 4 is a database that stores map information. The map database 4 is formed, for example, in a storage device such as a hard disk drive (HDD) mounted on the vehicle. The map information includes position information, information on a shape of the road (for example, a curve, types of the straight portion, a curvature of a curve, or the like), information on positions of a merge point and a branch, and information on a position of a building. The map database 4 may be stored in a computer of a facility such as a management center capable of communicating with the vehicle.

In the map database 4, for example, data of the switching location which is a location where autonomous driving terminates is stored in advance. The switching location is a location on a target route where the autonomous driving of the vehicle terminates and the driving state of the vehicle is switched from autonomous driving to the manual-driving. Examples of the switching location may be, for example, include an exit location in a freeway, a start location of traffic control due to a bad weather, and a start location of traffic control due to an accident. The data of the switching location may be stored in a database other than the map database 4. The data of the switching location may not be included in the in-vehicle database, but may be provided from a remote data server by a communication function.

The torque sensor 5 is provided on a steering shaft 22 of a steering device 20 of the vehicle, and measures the steering torque (details will be described later). The torque sensor 5 transmits the measured steering torque information to the ECU 10. The torque sensor 5 configures a steering determination device 50.

The HMI 6 is an interface for inputting and outputting information between the autonomous driving system 100 and the occupants (including the driver). The HMI 6 includes, for example, a display, a speaker, and the like. The HMI 6 outputs an image to the display and outputs a voice from the speaker according to a control signal from the ECU 10. The display may be a head up display.

The actuator 7 is a device that performs a travel control of the vehicle. The actuator 7 includes at least a throttle actuator, a brake actuator, and a steering actuator. The throttle actuator controls an amount of air supplied to the engine (throttle opening degree) according to the control signal from the ECU 10, and controls the driving force of the vehicle. When the vehicle V is a hybrid vehicle, in addition to the amount of air supplied to the engine, the control signal from the ECU 10 is input to the motor as a power source to control the driving force. When the vehicle is an electric vehicle, the control signal from the ECU 10 is input to a motor as a power source to control the driving force. The motor as the power source in these cases configures the actuator 7.

The brake actuator controls the brake system according to the control signal from the ECU 10, and controls the braking force applied to the vehicle wheels of the vehicle. For example, a hydraulic brake system can be used as the brake system. The steering actuator controls the driving of the EPS motor in an electric power steering (EPS) device according to the control signal from the ECU 10.

Next, the steering device 20 of the vehicle and the steering torque measured by the torque sensor 5 will be described.

Figure 2:
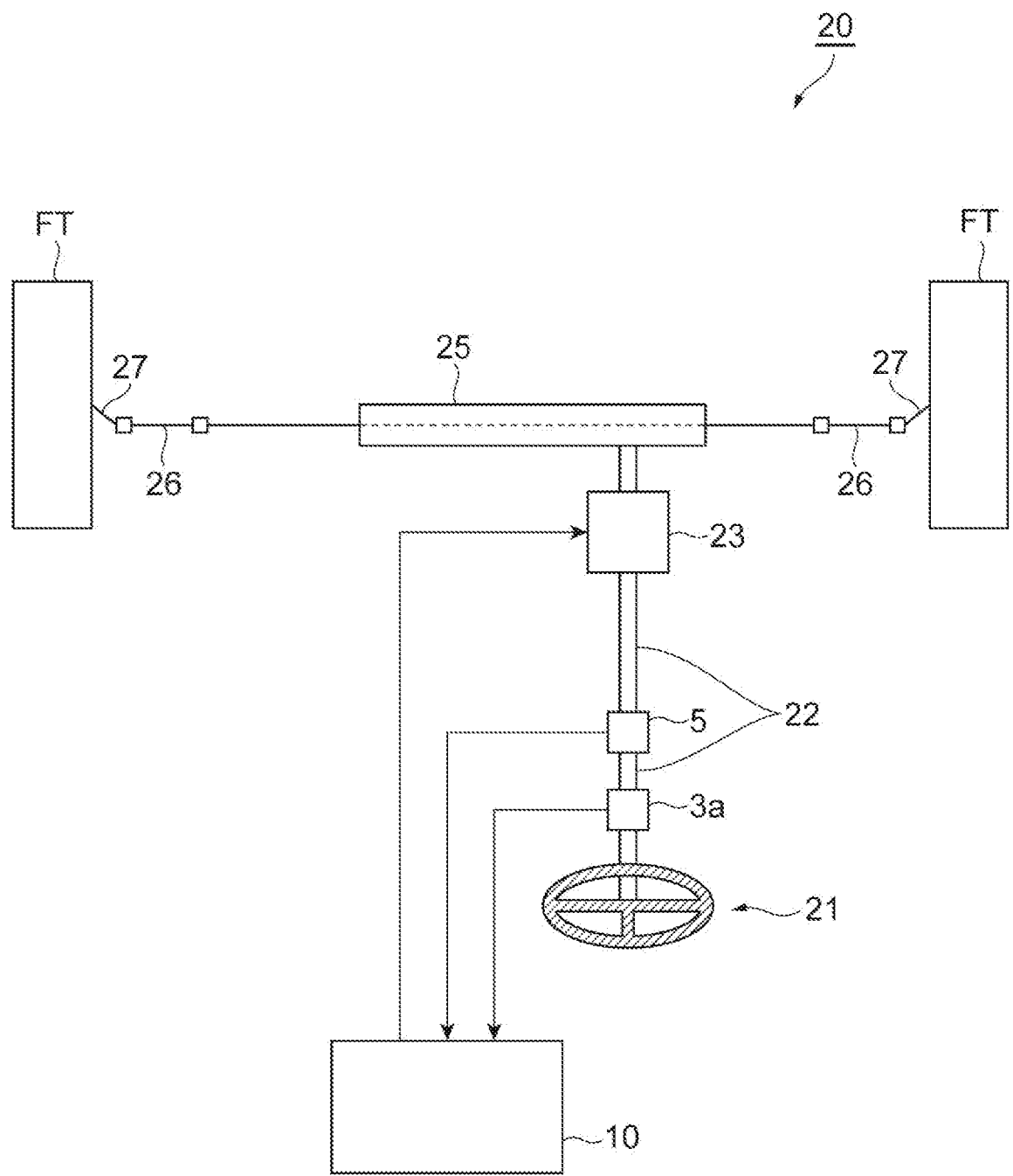
FIG. 2 is a schematic configuration diagram illustrating an example of a steering device.

FIG. 2 is a schematic diagram illustrating the configuration of the steering device 20 of the vehicle. As illustrated in FIG. 2, the steering device 20 is an electric power steering device that steers the front wheels FT in response to the operation of the steering wheel 21 or the control signal of the autonomous driving from the ECU 10. The steering device 20 includes a steering wheel 21, a steering shaft 22, an EPS motor 23, a rack and pinion mechanism 25, tie rods 26, and knuckle arms 27.

The steering wheel 21 is connected to the rack and pinion mechanism 25 via the steering shaft 22. A steering angle sensor 3*a* and the torque sensor 5 are provided on the steering shaft 22. The EPS motor 23 includes, for example, an electric motor and a reduction gear, and is controlled by the ECU 10 to apply an assist torque to the steering shaft 22. The rack and pinion mechanism 25 is configured with a steering rod on which a rack is formed and a pinion rod on which a pinion is formed. In the present embodiment, the steering shaft 22 and the pinion rod of the rack and pinion mechanism 25 are physically connected to each other.

The rack and pinion mechanism 25 converts a rotational motion transmitted from the steering wheel 21 via the steering shaft 22 into a linear motion. The knuckle arms 27 are coupled to both ends of the steering rod of rack and pinion mechanism 24 via the tie rods 25. The knuckle arms 27 are operated through the tie rod 25 by the operation of the rack and pinion mechanism 24.

In this way, the front wheels FT are steered.

Here, the torque sensor 5 is provided on the middle portion of the steering shaft 22. The torque sensor 5 measures a torsion torque of the steering shaft 22 based on an amount of torsion of a torsion bar included in the steering shaft 22. The torsion torque of the steering shaft 22 is a torque that causes the steering shaft 22 to be twisted by at least one of the torque from the steering wheel 21, the torque from the rack and pinion mechanism 25, and the output torque of the EPS motor 23.

The torque from the steering wheel 21 means the torque input from the steering wheel 21 to the steering shaft 22. The torque from the steering wheel 21 includes a steering operation torque by the driver's steering operation and a rotation torque due to the acceleration acting on the vehicle. The steering operation torque means a torque input from the steering wheel 21 to the steering shaft 22 by a driver's operation to grip and rotate the steering wheel 21. The rotation torque means a torque that is input to the steering shaft 22 from the steering wheel 21 as the steering wheel 21 rotates (spins) in accordance with the acceleration acting on the vehicle. The rotation torque is, for example, a momentum generated around the steering shaft 22 (a torque input from the steering wheel 21 to the steering shaft 22) due to the inertial force and an eccentricity; wherein the inertial force corresponding to the acceleration acting on the vehicle working on the center of gravity of the steering wheel 21 as a whole, and wherein the eccentricity of the center of gravity of the steering wheel 21 with respect to the axis of the steering shaft 22.

The torque from the rack and pinion mechanism 25 means a torque transmitted from the rack and pinion mechanism 25 to the steering shaft 22. The torque from the rack and pinion mechanism 25 may include, for example, a reaction force torque due to the road reaction force applied to the front wheel FT of the vehicle.

Figure 3:
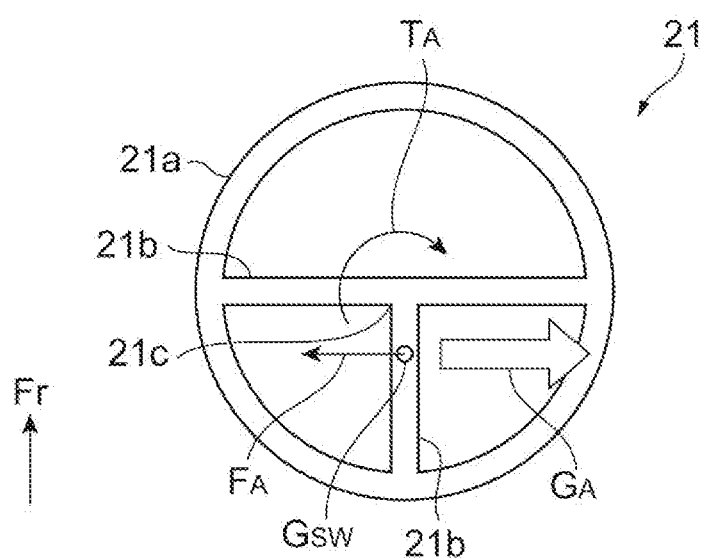
FIG. 3 is a diagram for explaining a rotation torque.

An example of the rotation torque will be described with reference to FIG. 3. FIG. 3 is a diagram for explaining the rotation torque. In FIG. 3, the upward direction on the paper (arrow Fr direction) is toward the front of the vehicle, and the right-left direction on the paper is along the right-left direction of the vehicle.

As illustrated in FIG. 3, the steering wheel 21 includes a ring-shaped rim 21a, a plurality of (here, three) spokes 21b provided inside a rim 21a, and a boss portion 21c that connects the ring-shaped rim 21a to the steering shaft 22 via each spoke 21b. On the boss portion 21c, for example, an air bag device (not illustrated) is provided. For example, the steering shaft 22 is attached to the boss portion 21c at a position where the extension lines of the plurality of spokes 21b intersect.

In the present embodiment, the center of gravity $G_{SW}$ of the steering wheel 21 is eccentric so as to be separated from the axis of the steering shaft 22 by a predetermined distance. The center of gravity $G_{SW}$ does not exist on the boss portion 21c, and for example, the center of gravity $G_{SW}$ is positioned at a predetermined distance below the boss portion 21c in the steering wheel 21 in the direction of the straight travel state. The position of the center of gravity $G_{SW}$ on the steering wheel 21 is determined in advance according to the arrangement of a heavy object such as the airbag device.

In the example in FIG. 3, lateral acceleration $G_A$ is acting on the steering wheel 21 in the vehicle right direction in the straight travel state. In this case, an inertial force $F_A$ in the left direction of the vehicle corresponding to the lateral acceleration $G_A$ works on the center of gravity $G_{SW}$ of the steering wheel 21. At this time, due to the eccentricity between the center of gravity $G_{SW}$ on which the inertial force $F_A$ acts and the axis of the steering shaft 22, a momentum is generated around the steering shaft 22 according to the lateral acceleration $G_A$, and a torque $T_A$ is generated as the rotation torque.

Figure 4A:
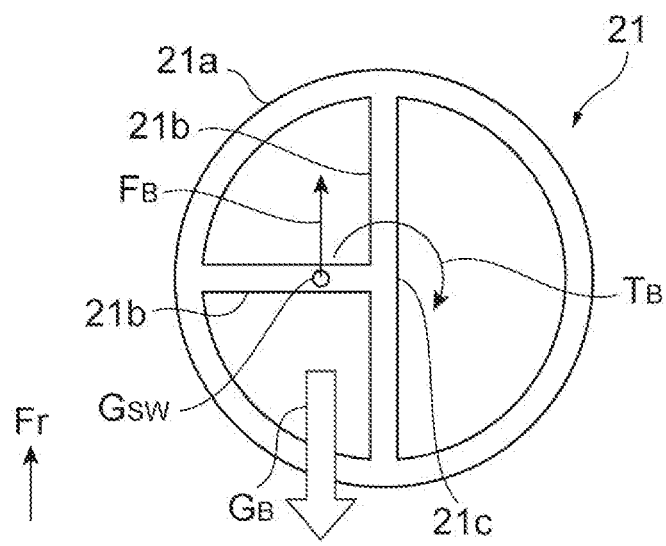
FIG. 4A is a diagram for explaining a rotation torque.
Figure 4B:
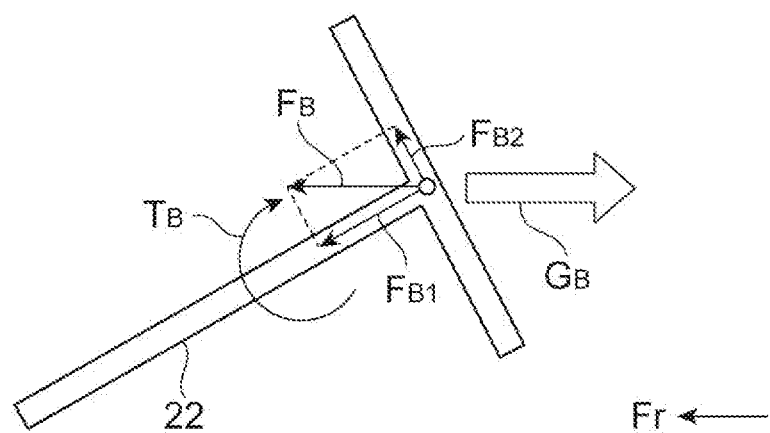
FIG. 4B is a diagram illustrating the rotation torque in FIG. 4A in a side view.

FIG. 4A is a diagram for explaining the rotation torque. FIG. 4B is a diagram illustrating the rotation torque in FIG. 4A in a side view. In FIG. 4B, the steering wheel 21 and the steering shaft 22 viewed from the left side of the vehicle are schematically illustrated. In FIG. 4B, the left direction on the paper (arrow Fr direction) is toward the front of the vehicle, and the vertical direction on the paper is along the vehicle vertical direction.

In the example in FIG. 4A and FIG. 4B, as illustrated in FIG. 4A, a longitudinal acceleration $G_B$ in the backward direction of the vehicle acts on the steering wheel 21 in a state of being rotated about 90° clockwise from the straight travel state. In this case, an inertial force $F_B$ in the front direction of the vehicle corresponding to the longitudinal acceleration $G_B$ works on the center of gravity $G_{SW}$ of the steering wheel 21. Specifically, as illustrated in FIG. 4B, since the steering shaft 22 is generally provided to be inclined in such a manner that the front portion is lowered, a component force $F_{B1}$ along the steering shaft 22 and a component force $F_{B2}$ along the upward direction of the vehicle which is perpendicular to the steering shaft 22 are generated in the center of gravity $G_{SW}$ of the steering wheel 21 as the component force of the inertial force $F_B$ corresponding to the longitudinal acceleration $G_B$. Due to the eccentricity between the center of gravity $G_{SW}$ on which the component force $F_{B2}$ acts and the axis of the steering shaft 22, a momentum is generated by the component force $F_{B2}$ around the steering shaft 22, and then, a torque $T_B$ is generated as the rotation torque.

Figure 5A:
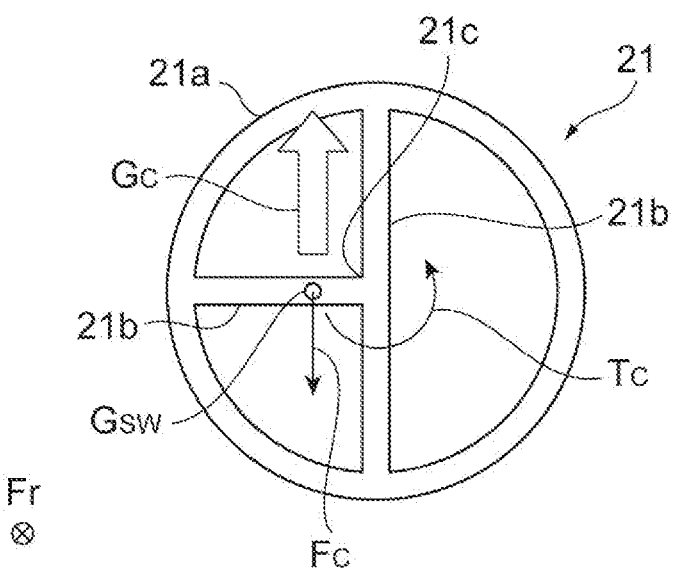
FIG. 5A is a diagram for explaining a rotation torque.
Figure 5B:
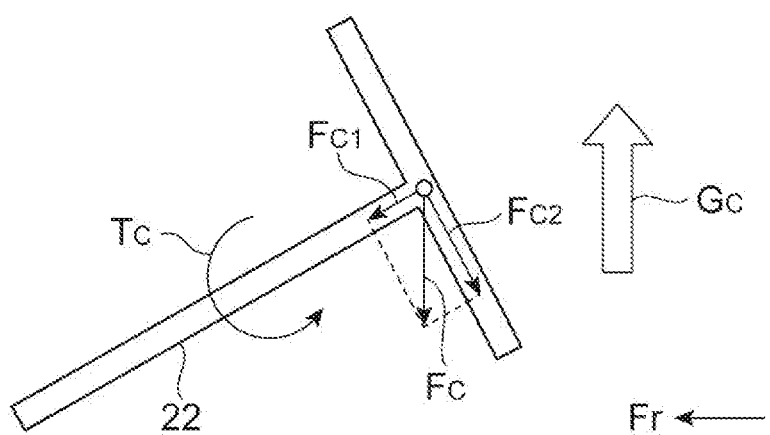
FIG. 5B is a diagram illustrating the rotation torque in FIG. 5A in a side view.

FIG. 5A is a diagram for explaining the rotation torque. FIG. 5B is a diagram illustrating the rotation torque in FIG. 5A in a side view. In FIG. 5A, the depth direction on the paper (Fr direction) is toward the front of the vehicle, and the right-left direction on the paper is along the right-left direction of the vehicle. In FIG. 5B, the steering wheel 21 and the steering shaft 22 as viewed from the left side of the vehicle are schematically illustrated. In FIG. 5B, the left direction (arrow Fr direction) on the paper surface is toward the front of the vehicle, and the vertical direction on the paper is along the vertical direction of the vehicle.

In the example in FIG. 5A and FIG. 5B, as illustrated in FIG. 5A, a vertical acceleration $G_C$ in the upward direction of the vehicle acts on the steering wheel 21 in a state of being rotated about 90° clockwise from the straight travel state. In this case, an inertial force $F_C$ in the downward direction of the vehicle corresponding to vertical acceleration $G_C$ works on the center of gravity $G_{SW}$ of the steering wheel 21. Specifically, as illustrated in FIG. 5B, a component force $F_{C1}$ along the steering shaft 22 and a component force $F_{C2}$ along the downward direction of the vehicle which is perpendicular to the steering shaft 22 are generated in the center of gravity $G_{SW}$ of the steering wheel 21 as the component force of the inertial force $F_C$ corresponding to the vertical acceleration $G_C$. Due to the eccentricity between the center of gravity $G_{SW}$ on which the component force $F_{C2}$ acts and the axis of the steering shaft 22, a momentum is generated by the component force $F_{C2}$ around the steering shaft 22, and then, a torque $T_C$ is generated as the rotation torque.

Returning to FIG. 1, a functional configuration of the ECU 10 will be described. ECU 10 includes a vehicle position recognition unit 11, a travel state recognition unit (an acceleration recognition unit) 12, a surrounding environment recognition unit 13, a trajectory generation unit 14, a torque recognition unit 15, a threshold value setting unit 16, a steering determination unit 17, a manual-driving switching unit 18, and a vehicle control unit 19. Some of the functions of the ECU 10 described below may be performed by a computer of a facility such as a management center that can communicate with the vehicle.

The vehicle position recognition unit 11 recognizes the position of the vehicle on the map based on the position information from the GNSS receiver 1 and the map information in the map database 4. The vehicle position recognition unit 11 accurately recognizes the position of the vehicle by a simultaneous localization and mapping (SLAM) technology or the like using the position information on a target object included in the map information in the map database 4 and the result of detection performed by the external sensor 2. The vehicle position recognition unit 11 may also recognize the position of the vehicle on the map by a known method.

The travel state recognition unit 12 recognizes the travel state of the vehicle based on the result of detection performed by the internal sensor 3. The travel state includes the vehicle speed of the vehicle, the acceleration of the vehicle, and the yaw rate of the vehicle. Specifically, the travel state recognition unit 12 recognizes the vehicle speed of the vehicle based on the vehicle speed information from the vehicle speed sensor. The travel state recognition unit 12 recognizes an orientation of the vehicle based on the yaw rate information from the yaw rate sensor. The travel state recognition unit 12 recognizes the acceleration acting on the vehicle based on the acceleration information from the accelerator sensor. The travel state recognition unit 12 recognizes the longitudinal acceleration and the lateral acceleration. The travel state recognition unit 12 may recognize the vertical acceleration.

The surrounding environment recognition unit 13 recognizes the surrounding environment of the vehicle based on the result of detection performed by the external sensor 2. The surrounding environment includes the state of objects around the vehicle. The surrounding environment recognition unit 13 recognizes the surrounding environment of the vehicle by a known method based on an image captured by the camera and the obstacle information from the radar sensor.

The trajectory generation unit 14 generates a trajectory to be used for the autonomous driving of the vehicle. The trajectory generation unit 14 generates the trajectory for the autonomous driving by various methods based on the destination set in advance, the map information in map database 4, the position of the vehicle on the map recognized by vehicle position recognition unit 11, the travel state of the vehicle recognized by the travel state recognition unit 12 (the vehicle speed, the yaw rate, or the like), the surrounding environment recognized by the surrounding environment recognition unit 13. The destination may be set by the occupants of the vehicle, or may be automatically proposed by the autonomous driving system 100 or a known navigation system.

The torque recognition unit 15 recognizes the steering torque based on the steering torque information from the torque sensor 5. For example, the torque recognition unit 15 recognizes the absolute value of the torsion torque of the steering shaft 22 detected by the torque sensor 5 as the steering torque. The torque recognition unit 15 recognizes a combined torque of the steering operation torque by the driver's steering operation and the rotation torque by the acceleration acting on the vehicle, as the torque from the steering wheel 21 in the steering torque. The torque recognition unit 15 recognizes the combined torque without distinguishing the steering operation torque and the rotation torque from each other.

Specifically, for example, when the acceleration which is likely to generate the momentum around the steering shaft 22 is not acting on the vehicle, the torque recognition unit 15 recognizes the steering operation torque as the steering torque. For example, if the acceleration which is likely to generate the momentum around the steering shaft 22 is acting on the vehicle, the torque recognition unit 15 recognizes the rotation torque as the steering torque in addition to the steering operation torque when the driver is performing the steering operation, and recognizes only the rotation torque as the steering torque when the driver is not performing the steering operation.

The threshold value setting unit 16 sets a steering torque threshold value (threshold value) based on the acceleration recognized by the travel state recognition unit 12. The steering torque threshold value is a threshold value of the steering torque to be used in determining the steering state.

As an example, the threshold value setting unit 16 may calculate threshold value setting parameters according to longitudinal, lateral, and vertical accelerations, and may set the steering torque threshold value using the calculated threshold value setting parameter. For example, the threshold value setting unit 16 can set the steering torque threshold value using the following Equation (1) stored in advance.

steering torque threshold value=longitudinal threshold value setting parameter×absolute value of the longitudinal acceleration+lateral threshold value setting parameter×absolute value of the lateral acceleration+vertical threshold value setting parameter×absolute value of the vertical acceleration+torque constant     Equation (1):

In Equation (1), the longitudinal threshold value setting parameter is a parameter used by the threshold value setting unit 16 to set the steering torque threshold value based on the longitudinal acceleration. The lateral threshold value setting parameter is a parameter used by the threshold value setting unit 16 to set the steering torque threshold value based on the lateral acceleration. The vertical threshold value setting parameter is a parameter used by the threshold value setting unit 16 to set the steering torque threshold value based on the vertical acceleration. Each threshold value setting parameter here is a proportional coefficient set by the threshold value setting unit 16 according to the acceleration in each direction to be multiplied. Each threshold value setting parameter may be set to a positive value, for example, according to the absolute value of the acceleration in each direction. The absolute value of the acceleration in each direction is the absolute value of the acceleration in each direction recognized by the travel state recognition unit 12. In addition, in Equation (1), the torque constant is a constant set in advance so as to represent an error factor of the steering torque included in the steering torque threshold value (for example, an error of the torque sensor 5 itself, an error in temperature characteristics, and the like).

The threshold value setting unit 16 sets the steering torque threshold value such that the steering torque threshold value decreases as the absolute value of longitudinal acceleration decreases. The threshold value setting unit 16 may set the steering torque threshold value such that the steering torque threshold value continuously decreases as the absolute value of longitudinal acceleration decreases. The threshold value setting unit 16 may set the steering torque threshold value such that the steering torque threshold value decreases as the absolute value of longitudinal acceleration decreases when the vertical acceleration does not change. The threshold value setting unit 16 here calculates the longitudinal threshold value setting parameter such that the longitudinal threshold value setting parameter continuously decreases as the absolute value of longitudinal acceleration decreases, for example, when vertical acceleration and the lateral acceleration do not change.

Figure 6A:
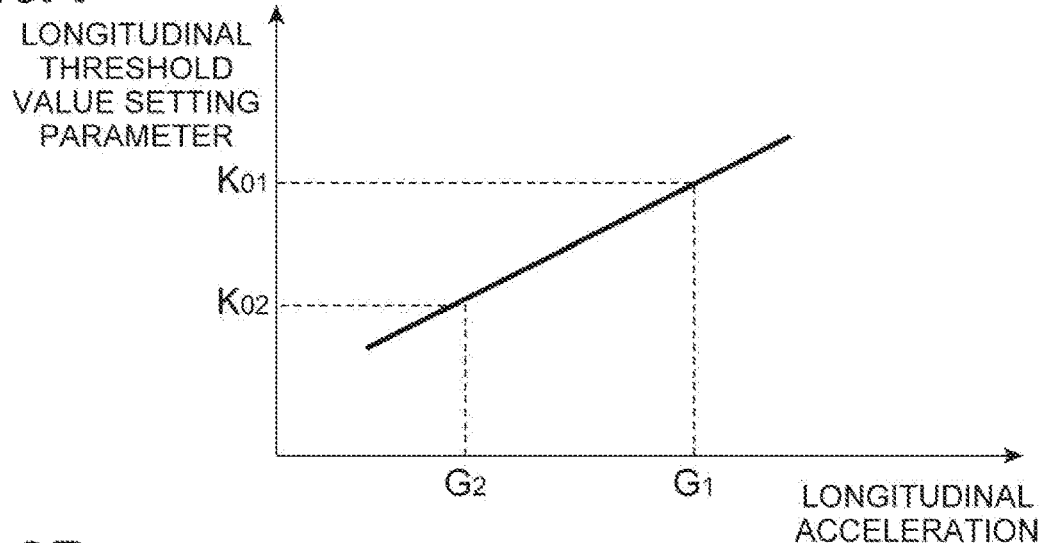
FIG. 6A is a diagram illustrating an example of longitudinal threshold value setting parameters.

FIG. 6A is a diagram illustrating an example of the longitudinal threshold value setting parameters. In FIG. 6A, the longitudinal acceleration is illustrated on the horizontal axis, and the longitudinal threshold value setting parameter when the vertical acceleration and lateral acceleration do not change is illustrated on the vertical axis. In the example in FIG. 6A, the longitudinal threshold value setting parameter is calculated by the threshold value setting unit 16 based on a relationship expressed as a straight line through two points: a point indicating a longitudinal threshold value setting parameter $K_{01}$ when the longitudinal acceleration is acceleration $G_1$, and a point indicating a longitudinal threshold value setting parameter $K_{02}$ when the longitudinal acceleration is acceleration $G_2$. The relationship may be stored in advance in the ECU 10 as map data or a mathematical expression, for example.

The threshold value setting unit 16 sets the steering torque threshold value such that the steering torque threshold value decreases as the absolute value of the lateral acceleration decreases. The threshold value setting unit 16 may set the steering torque threshold value such that the steering torque threshold value continuously decreases as the absolute value of the lateral acceleration decreases. The threshold value setting unit 16 may set the steering torque threshold value such that the steering torque threshold value decreases as the absolute value of the lateral acceleration decreases when the vertical acceleration does not change. The threshold value setting unit 16 here calculates the lateral threshold value setting parameter such that the lateral threshold value setting parameter continuously decreases as the absolute value of lateral acceleration decreases, for example, when the vertical acceleration and the longitudinal acceleration do not change.

Figure 6B:
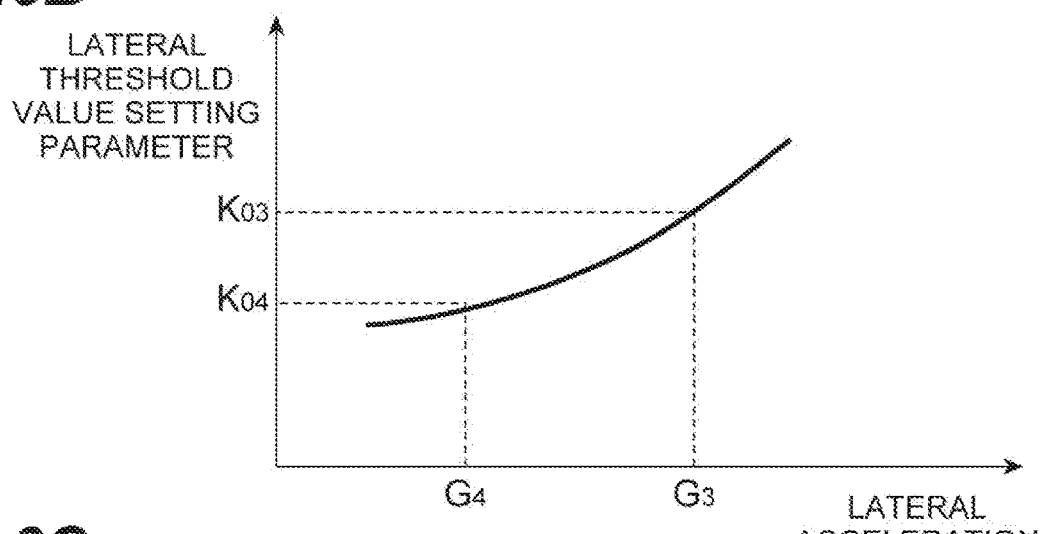
FIG. 6B is a diagram illustrating an example of lateral threshold value setting parameters.

FIG. 6B is a diagram illustrating an example of the lateral threshold value setting parameters. In FIG. 6B, the lateral acceleration is illustrated on the horizontal axis, and the lateral threshold value setting parameter when the vertical acceleration and longitudinal acceleration do not change is illustrated on the vertical axis. In the example in FIG. 6B, the lateral threshold value setting parameter is calculated by the threshold value setting unit 16 based on a relationship expressed as a curved line through two points: a point indicating a lateral threshold value setting parameter $K_{03}$ when the lateral acceleration is acceleration $G_3$, and a point indicating a lateral threshold value setting parameter $K_{04}$ when the lateral acceleration is acceleration $G_4$. In the example in FIG. 6B, the curved line is a downwardly convex parabolic line. The curved line is not limited thereto, and may be an upwardly convex parabolic line or a curved line other than a parabolic line. The relationship may be stored in advance in the ECU 10 as map data or a mathematical expression, for example.

The threshold value setting unit 16 sets the steering torque threshold value such that the steering torque threshold value decreases as the absolute value of the vertical acceleration decreases. The threshold value setting unit 16 may set the steering torque threshold value such that the steering torque threshold value continuously decreases as the absolute value of the vertical acceleration decreases. The threshold value setting unit 16 here calculates the vertical threshold value setting parameter such that the vertical threshold value setting parameter continuously decreases as the absolute value of vertical acceleration decreases when the longitudinal acceleration and the lateral acceleration do not change, for example.

Figure 6C:
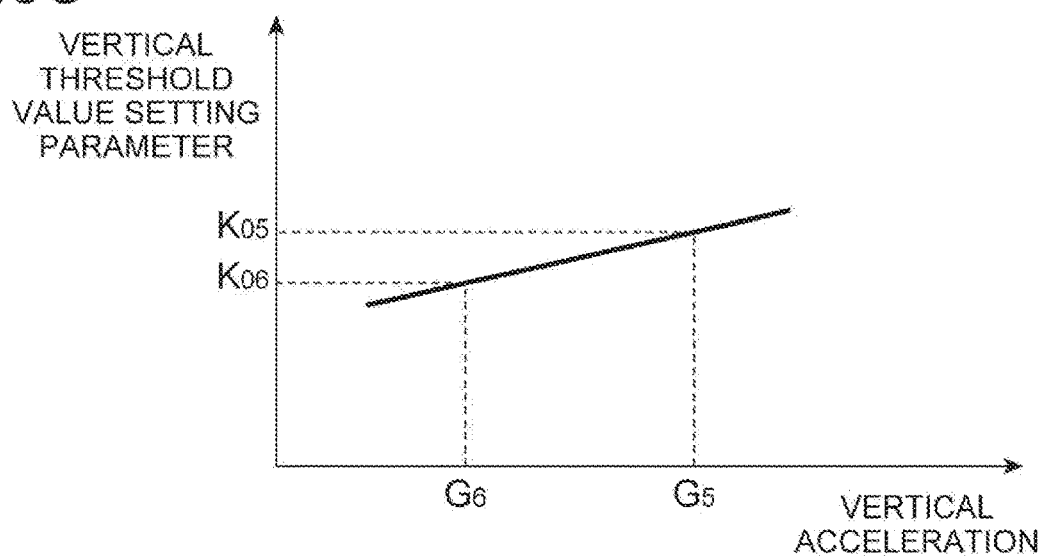
FIG. 6C is a diagram illustrating an example of vertical threshold value setting parameters.

FIG. 6C is a diagram illustrating an example of the vertical threshold value setting parameters. In FIG. 6C, the vertical acceleration is illustrated on the horizontal axis, and the vertical threshold value setting parameter when the longitudinal acceleration and the lateral acceleration do not change is illustrated on the vertical axis. In the example in FIG. 6C, the vertical threshold value setting parameter is calculated by the threshold value setting unit 16 based on a relationship expressed as a straight line through two points: a point indicating a vertical threshold value setting parameter $K_{05}$ when the vertical acceleration is acceleration $G_5$, and a point indicating a vertical threshold value setting parameter $K_{06}$ when the vertical acceleration is acceleration $G_6$. As an example, a slope of the straight line in FIG. 6C is smaller than a slope of the straight line in FIG. 6A. The relationship between the slopes of the straight lines is not limited thereto, and the slope of the straight line in FIG. 6C may be equal to or greater than the slope of the straight line in FIG. 6A. The relationship may be stored in advance in the ECU 10 as map data or a mathematical expression, for example.

The longitudinal threshold value setting parameter in FIG. 6A monotonously decreases as the absolute value of longitudinal acceleration decreases, however, in a certain section of the longitudinal acceleration, the longitudinal threshold value setting parameter may be a constant value. The lateral threshold value setting parameter in FIG. 6B decreases monotonously as the absolute value of the lateral acceleration decreases, however, in a certain section of the lateral acceleration, the lateral threshold value setting parameter may be a constant value. The vertical threshold value setting parameter in FIG. 6C decreases monotonously as the absolute value of the vertical acceleration decreases, however, in a certain section of the vertical acceleration, the vertical threshold value setting parameter may be a constant value.

The steering determination unit 17 determines that the driver is in the steering state if the steering torque recognized by the torque recognition unit 15 is equal to or greater than the steering torque threshold value set by the threshold value setting unit 16. If the steering torque is less than the steering torque threshold value, the steering determination unit 17 determines that the driver is not in the steering state. The steering determination unit 17 may determine whether or not the driver is in the steering state by combinedly using a result of measurement performed by a touch sensor (not illustrated) provided on the steering wheel 21.

If it is determined by the steering determination unit 17 that the driver is in the steering state during autonomous driving, the manual-driving switching unit 18 performs a manual-driving switching control.

As an example, if the vehicle in autonomous driving approaches the switching location where the autonomous driving is terminated, the manual-driving switching unit 18 controls the FINE 6 so as to notify the driver of the approach of the vehicle to the switching location. When the HMI 6 is controlled to perform the above-described notification to the driver, and when it is determined by the steering determination unit 17 that the driver is in the steering state due to the driver's steering operation in response to the notification of the approach, the manual-driving switching unit 18 performs the manual-driving switching control to switch the driving mode from the autonomous driving to the manual-driving. If it is determined by the steering determination unit 17 that the driver is not in the steering state, the manual-driving switching unit 18 does not perform the manual-driving switching control. For example, if the vehicle in autonomous driving reaches the switching location while it is not determined by the steering determination unit 17 that the driver is in the steering state, the manual-driving switching unit 18 may switch the driving mode from the autonomous driving to the manual-driving by a predetermined control that is different from the manual-driving switching control.

The vehicle control unit 19 performs the autonomous driving of the vehicle based on the position of the vehicle on the map recognized by the vehicle position recognition unit 11, the travel state of the vehicle recognized by the travel state recognition unit 12, the surrounding environment recognized by the surrounding environment recognition unit 13, and the trajectory generated by the trajectory generation unit 14. The vehicle control unit 19 performs the autonomous driving by driving the vehicle along the trajectory. The vehicle control unit 19 performs the autonomous driving by a well-known method.

[Example of Calculation Processing by ECU 10]

Figure 7:
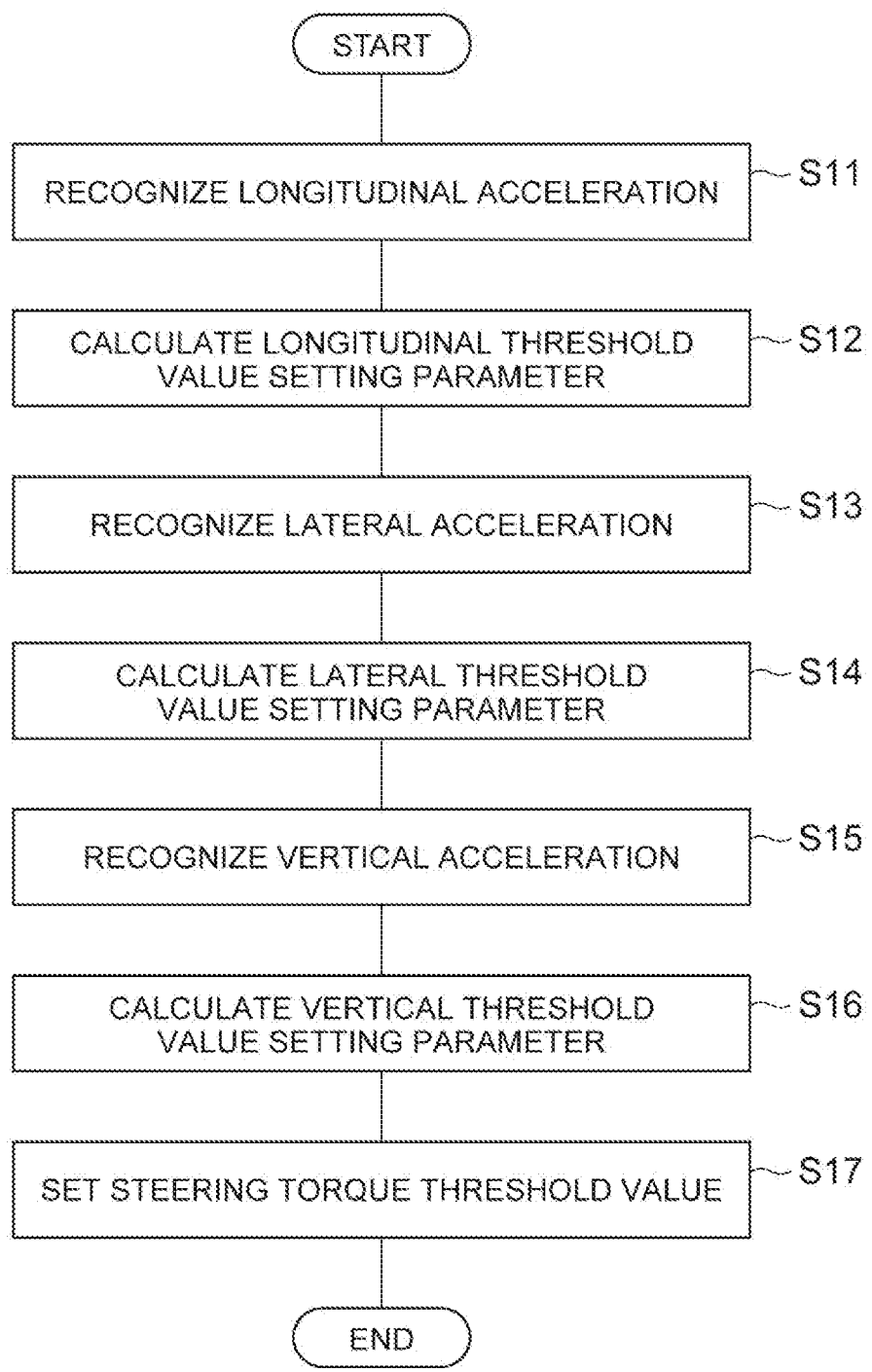
FIG. 7 is a flowchart illustrating threshold value setting processing.

Next, an example of calculation processing by the steering determination device 50 and the autonomous driving system 100 will be described. FIG. 7 is a flowchart illustrating the threshold value setting processing. For example, the processing in the flowchart illustrated in FIG. 7 is repeatedly executed for each predetermined calculation period during the autonomous driving of the vehicle.

In S11, the ECU 10 of the steering determination device 50 recognizes the longitudinal acceleration of the vehicle using the travel state recognition unit 12. The travel state recognition unit 12 recognizes longitudinal acceleration based on the acceleration information of the vehicle by the internal sensor 3. In S12, the ECU 10 calculates the longitudinal threshold value setting parameter using the threshold value setting unit 16. The threshold value setting unit 16 calculates the longitudinal threshold value setting parameter based on the longitudinal acceleration recognized by the travel state recognition unit 12, and for example, using the relationship illustrated in FIG. 6A.

In S13, the ECU 10 recognizes the lateral acceleration of the vehicle using the travel state recognition unit 12. The travel state recognition unit 12 recognizes the lateral acceleration based on the acceleration information of the vehicle by the internal sensor 3. In S14, the ECU 10 calculates the lateral threshold value setting parameter using the threshold value setting unit 16. The threshold value setting unit 16 calculates the lateral threshold value setting parameter based on the lateral acceleration recognized by the travel state recognition unit 12, and for example, using the relationship illustrated in FIG. 6B.

In S15, the ECU 10 recognizes the vertical acceleration of the vehicle using the travel state recognition unit 12. The travel state recognition unit 12 recognizes the vertical acceleration based on the acceleration information of the vehicle by the internal sensor 3. In S16, the ECU 10 calculates the vertical threshold value setting parameter using the threshold value setting unit 16. The threshold value setting unit 16 calculates the vertical threshold value setting parameter based on the vertical acceleration recognized by the travel state recognition unit 12, and for example, using the relationship illustrated in FIG. 6C.

In S17, the ECU 10 sets the steering torque threshold value using the threshold value setting unit 16. The threshold value setting unit 16 sets the steering torque threshold value based on the longitudinal acceleration, the lateral acceleration, and the vertical acceleration recognized by travel state recognition unit 12, and the longitudinal threshold value setting parameter, the lateral threshold value setting parameter, and the vertical threshold value setting parameter calculated by threshold value setting unit 16. Thereafter, the ECU 10 terminates the calculation processing in FIG. 7.

Figure 8:
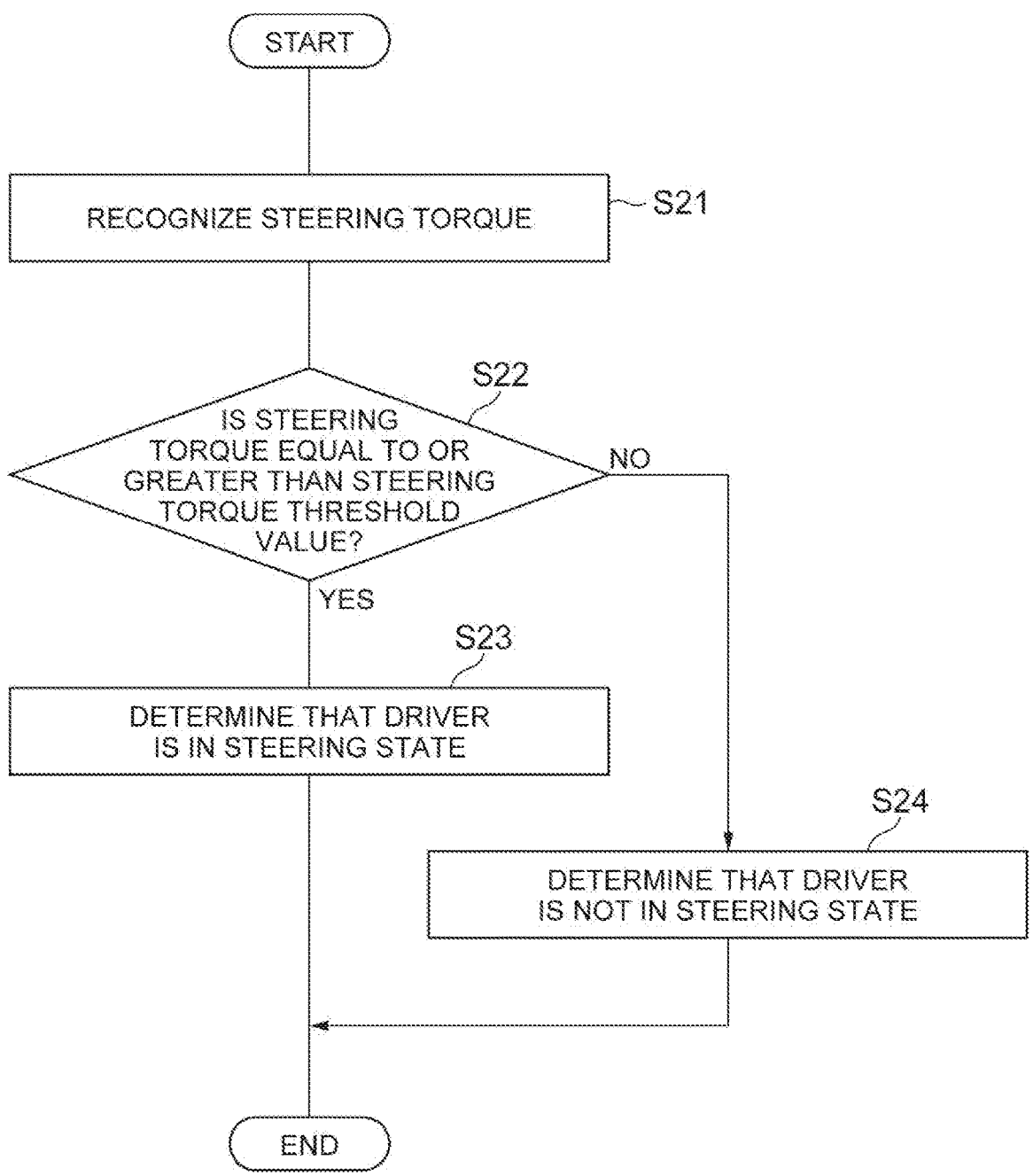
FIG. 8 is a flowchart illustrating steering state determination processing.

FIG. 8 is a flowchart illustrating steering state determination processing. For example, the processing in the flowchart illustrated in FIG. 8 is repeatedly executed for each predetermined calculation period during autonomous driving of the vehicle.

In S21, the ECU 10 recognizes the steering torque using the torque recognition unit 15. The torque recognition unit 15 recognizes the steering torque based on the result of measurement performed by the torque sensor 5.

In S22, the ECU 10 determines whether or not the steering torque is equal to or greater than the steering torque threshold value using the steering determination unit 17. If it is determined by the steering determination unit 17 that the steering torque is equal to or greater than the steering torque threshold value (YES in S22), the ECU 10 determines that the driver is in the steering state using the steering determination unit 17 in S 23. If the steering torque recognized by the torque recognition unit 15 is equal to or greater than the steering torque threshold value set by the threshold value setting unit 16, the steering determination unit 17 determines that the driver is in the steering state. On the other hand, if it is determined by the steering determination unit 17 that the steering torque is less than the steering torque threshold value (NO in S22), the ECU 10 determines that the driver is not in the steering state using the steering determination unit 17 in S 24. If the steering torque is less than the steering torque threshold value, the steering determination unit 17 determines that the driver is not in the steering state. Thereafter, the calculation processing in FIG. 8 is terminated.

Figure 9:
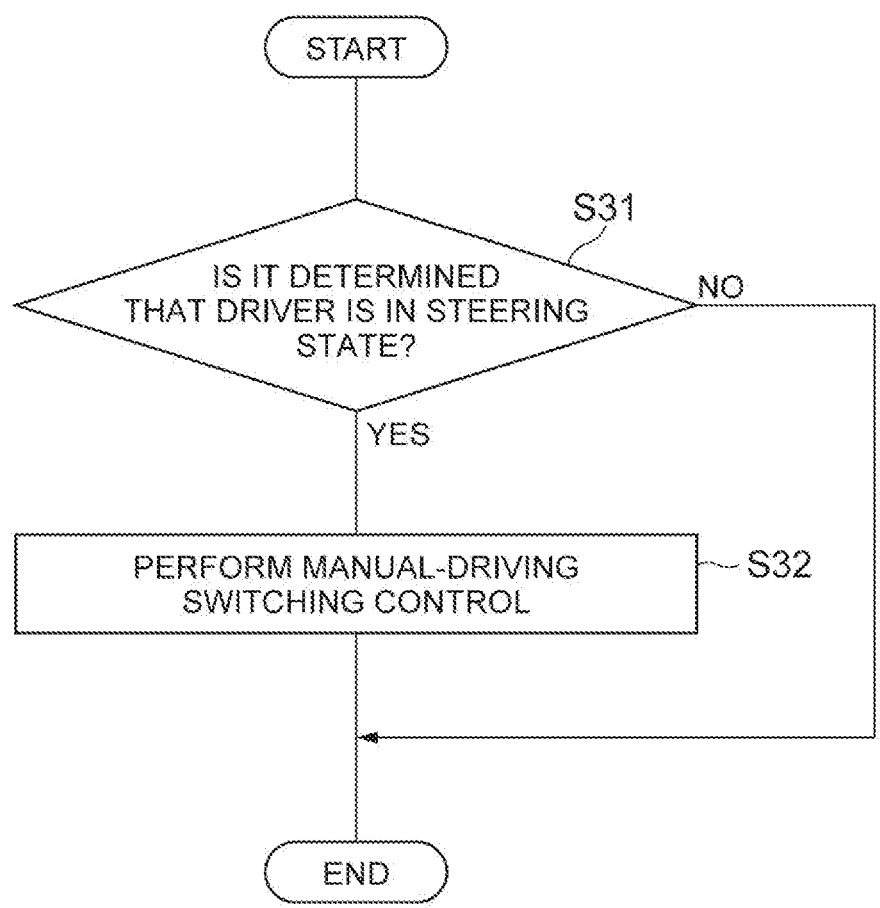
FIG. 9 is a flowchart illustrating manual-driving switching determination processing.

FIG. 9 is a flowchart illustrating manual-driving switching determination processing. For example, if the vehicle in autonomous driving approaches the switching location, the processing in the flowchart illustrated in FIG. 9 is repeatedly executed for each predetermined calculation period together with the notification processing for notifying the driver of the approach of the vehicle to the switching location.

In S31, the ECU 10 determines whether or not the steering determination unit 17 determines that the driver is in the steering state using the manual-driving switching unit 18. If it is determined by the steering determination unit 17 that the driver is in the steering state (YES in S31), the manual-driving switching unit 18 performs the manual-driving switching control in S32. On the other hand, if it is determined by the steering determination unit 17 that the driver is not in the steering state (NO in S31), the ECU 10 terminates the calculation processing in FIG. 9 without performing the manual-driving switching control using the manual-driving switching unit 18.

[Operational Effects]

As described above, in the steering device 20 of the vehicle, since the center of gravity $G_{SW}$ of the steering wheel 21 is eccentric with respect to the axis of the steering shaft 22, or the like, when the acceleration acts on the vehicle, the inertial force corresponding to the acceleration works on the center of gravity $G_{SW}$ of the steering wheel 21 as a whole. As a result, a momentum (rotation torque input from the steering wheel 21 to the steering shaft 22) due to the inertial force is generated around the steering shaft 22. That is, not only the steering operation torque by the driver's steering operation but also the rotation torque of the steering wheel 21 can be included in the steering torque detected by the torque sensor 5.

In this respect, according to the steering determination device 50, the steering torque threshold value is set by the threshold value setting unit 16 such that the steering torque threshold value decreases as the absolute value of the longitudinal acceleration or the lateral acceleration decreases. If the steering torque is equal to or greater than the steering torque threshold value, the steering determination unit 17 determines that the driver is in the steering state. In this way, for example, despite that the driver does not have an intention to steer, even if the rotation torque of the steering wheel 21 is generated according to the longitudinal acceleration or the lateral acceleration as the steering torque recognized based on the result of measurement performed by the torque sensor 5, it is possible to appropriately set the steering torque threshold value. As a result thereof, it is possible to appropriately determine the driver's steering state based on the steering torque.

In the steering determination device 50, the travel state recognition unit 12 further recognizes the vertical acceleration in the vertical direction of the vehicle, and the threshold value setting unit 16 sets the steering torque threshold value such that the steering torque threshold value decreases as the absolute value of the longitudinal acceleration or the lateral acceleration decreases when the vertical acceleration does not change. As a result, it is possible to appropriately set the steering torque threshold value in accordance with the fact that the rotation torque decreases as the longitudinal acceleration or the lateral acceleration decreases, while further considering the vertical acceleration.

In the steering determination device 50, the travel state recognition unit 12 recognizes the longitudinal acceleration, the lateral acceleration, and the vertical acceleration, and the threshold value setting unit 16 sets the threshold value such that the steering torque threshold value decreases as the absolute value of vertical acceleration decreases when the longitudinal acceleration and the lateral acceleration do not change. As a result, it is possible to appropriately set the steering torque threshold value in accordance with the fact that the rotation torque decreases as the vertical acceleration decreases when the longitudinal acceleration and the lateral acceleration do not change.

The autonomous driving system 100 includes the manual-driving switching unit 18 that performs the manual-driving switching control if it is determined by the above-described steering determination device 50 and the steering determination unit 17 of the steeling determination device 50 that the driver is in the steering state. As a result, it is possible to appropriately realize the switching to the manual-driving based on the result of appropriate determination of the driver's steering state which is based on the steering torque.

[Modification Example]

The present disclosure is not limited to the above-described embodiment. The present disclosure can be embodied in various forms including various modifications and improvements based on the knowledge of those skilled in the art, including the embodiments described above.

Figure 10A:
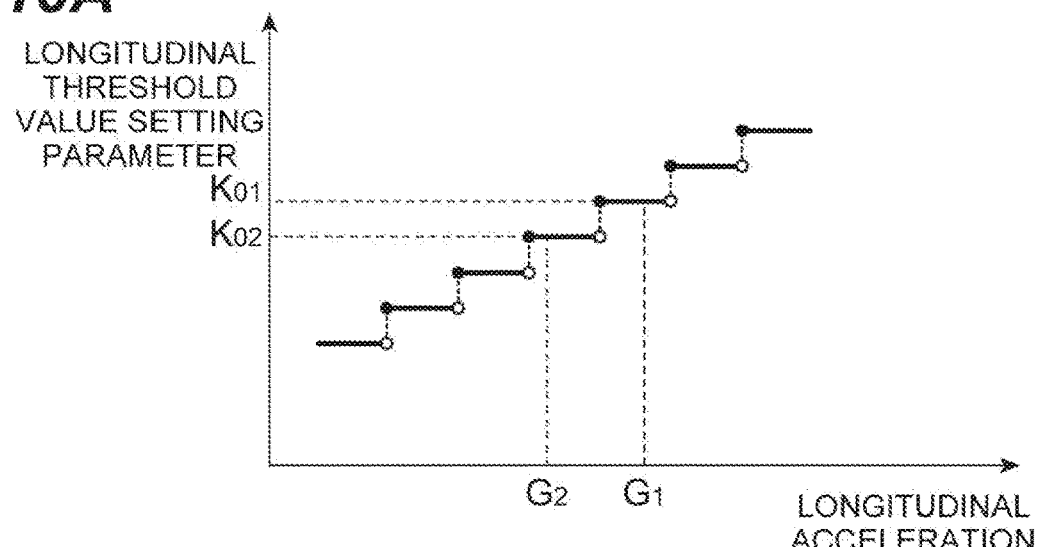
FIG. 10A is a diagram illustrating another example of the longitudinal threshold value setting parameters.

For example, the threshold value setting unit 16 may use a longitudinal threshold value setting parameter illustrated in FIG. 10A instead of the longitudinal threshold value setting parameter illustrated in FIG. 6A. Specifically, the threshold value setting unit 16 may set the steering torque threshold value such that the steering torque threshold value decreases stepwise as the absolute value of longitudinal acceleration decreases. For example, the threshold value setting unit 16 may calculate the longitudinal threshold value setting parameter such that the longitudinal threshold value setting parameter decreases stepwise as the absolute value of longitudinal acceleration decreases when the vertical acceleration and the lateral acceleration do not change. In the example in FIG. 10A, if the absolute value of the longitudinal acceleration is an acceleration $G_2$ which is less than the acceleration $G_1$, the longitudinal threshold value setting parameter becomes the longitudinal threshold value setting parameter $K_{02}$ which is less than the longitudinal threshold value setting parameter $K_{01}$ stepwise. The amount of change in which the longitudinal threshold value setting parameter decreases stepwise is substantially constant, but may not necessarily be substantially constant.

Figure 10B:
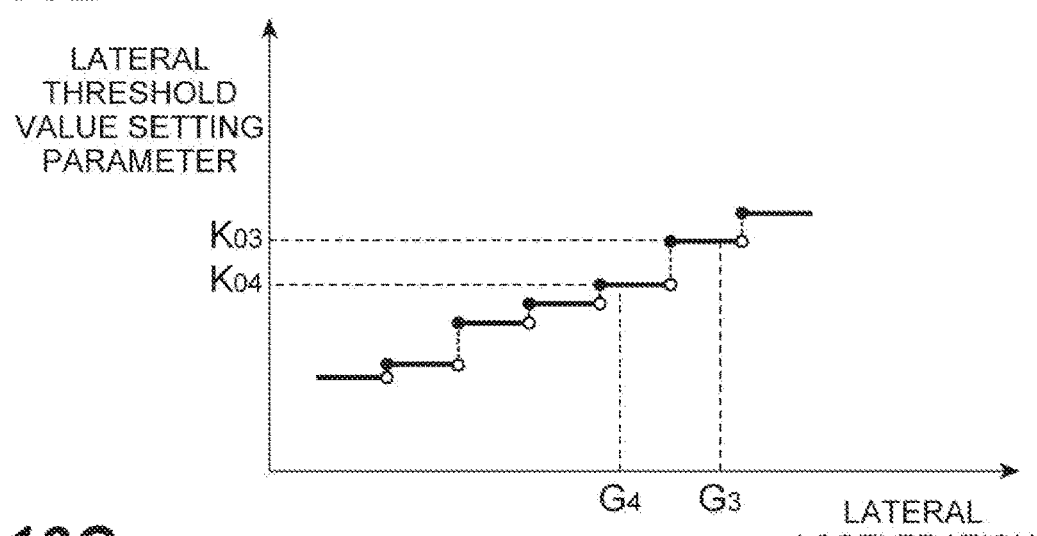
FIG. 10B is a diagram illustrating another example of the lateral threshold value setting parameters.

In addition, the threshold value setting unit 16 may use the lateral threshold value setting parameter illustrated in FIG. 10B instead of the lateral threshold value setting parameter illustrated in FIG. 6B. Specifically, the threshold value setting unit 16 may set the steering torque threshold value such that the steering torque threshold value decreases stepwise as the absolute value of lateral acceleration decreases. For example, the threshold value setting unit 16 may calculate the lateral threshold value setting parameter such that the lateral threshold value setting parameter decreases stepwise as the absolute value of lateral acceleration decreases when the vertical acceleration and the longitudinal acceleration do not change. In the example in FIG. 10B, if the absolute value of the lateral acceleration is an acceleration $G_4$ which is less than the acceleration $G_3$, the lateral threshold value setting parameter becomes the lateral threshold value setting parameter $K_{04}$ which is less than the lateral threshold value setting parameter $K_{03}$ stepwise. The amount of change in which the lateral threshold value setting parameter decreases stepwise is substantially constant, but may not necessarily be substantially constant.

Figure 10C:
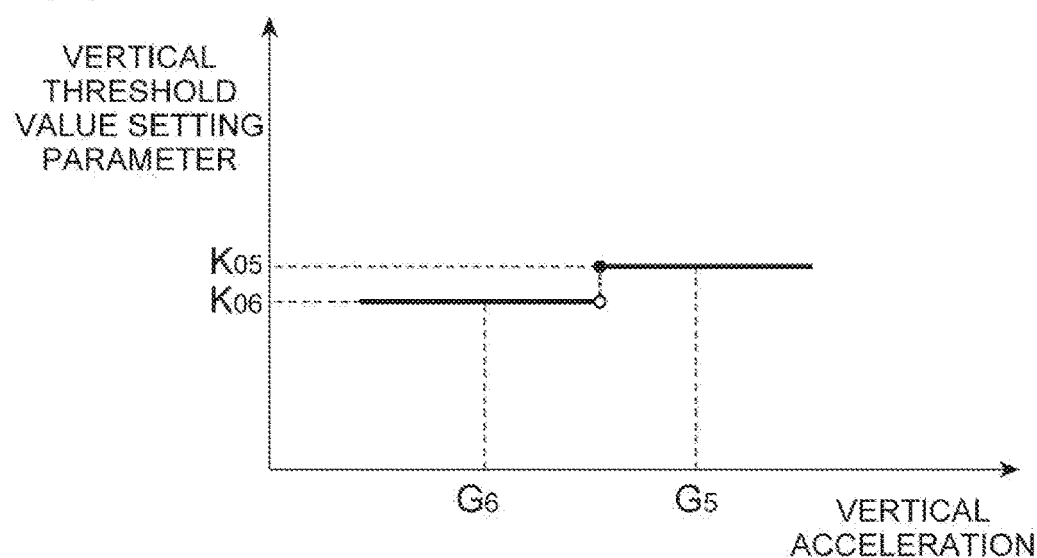
FIG. 10C is a diagram illustrating another example of the vertical threshold value setting parameters.

In addition, the threshold value setting unit 16 may use a vertical threshold value setting parameter illustrated in FIG. 10C instead of the vertical threshold value setting parameter illustrated in FIG. 6C. Specifically, the threshold value setting unit 16 may set the steering torque threshold value such that the steering torque threshold value decreases stepwise as the absolute value of vertical acceleration decreases. For example, the threshold value setting unit 16 may calculate the vertical threshold value setting parameter such that the vertical threshold value setting parameter decreases stepwise as the absolute value of vertical acceleration decreases when the longitudinal acceleration and the lateral acceleration do not change. In the example in FIG. 10C, if the absolute value of the vertical acceleration is an acceleration $G_6$ which is less than the acceleration $G_5$, the vertical threshold value setting parameter becomes the lateral threshold value setting parameter $K_{06}$ which is less than the vertical threshold value setting parameter $K_{05}$ stepwise. The aspect in which the threshold value setting parameter decreases stepwise may be an aspect in which the threshold value setting parameter decreases by only one step as in the example in FIG. 10C.

In the embodiment described above, the travel state recognition unit 12 recognizes all of the longitudinal acceleration, the lateral acceleration, and the vertical acceleration, but is not limited thereto. The travel state recognition unit 12 may recognize any one of the longitudinal acceleration, the lateral acceleration, and the vertical acceleration. In this case, the threshold value setting unit 16 may set the steering torque threshold value while omitting the terms for the two accelerations among the longitudinal acceleration, the lateral acceleration, and the vertical acceleration in Equation (1) described above, which were not recognized by the travel state recognition unit 12. Alternatively, the travel state recognition unit 12 may recognize any two of the longitudinal acceleration, the lateral acceleration, and the vertical acceleration. In this case, the threshold value setting unit 16 may set the steering torque threshold value while omitting the term for one acceleration among the longitudinal acceleration, the lateral acceleration, and the vertical acceleration in Equation (1) described above, which was not recognized by the travel state recognition unit 12. In addition, in the flowchart illustrated in FIG. 7, the recognition processing (one or two of S 11, S13, and S15) for the acceleration that is not recognized by the travel state recognition unit 12, and the threshold value setting parameter calculation processing (one or two of S12, S14, and S16) for the acceleration that is not recognized by the travel state recognition unit 12 may be omitted.

In the embodiment described above, the threshold value setting unit 16 sets the steering torque threshold value according to the longitudinal acceleration when the vertical acceleration and the lateral acceleration do not change, but is not limited thereto, and may set the steering torque threshold value according to the acceleration obtained by combining the longitudinal acceleration and the lateral acceleration when the vertical acceleration does not change. The threshold value setting unit 16 sets the steering torque threshold value according to the lateral acceleration when the longitudinal acceleration and the vertical acceleration do not change, but is not limited thereto, and may set the the steering torque threshold value according to the acceleration obtained by combining the vertical acceleration and the lateral acceleration when the longitudinal acceleration does not change. The threshold value setting unit 16 sets the steering torque threshold value according to the vertical acceleration when the lateral acceleration and the longitudinal acceleration do not change, but is not limited thereto, and may set the steering torque threshold value according to the acceleration obtained by combining the longitudinal acceleration and the vertical acceleration when the lateral acceleration does not change. The threshold value setting unit 16 may set the steering torque threshold value according to the acceleration obtained by combining the longitudinal acceleration, the lateral acceleration, and the vertical acceleration.

In the embodiment described above, the threshold value setting unit 16 may set the steering torque threshold value without using the above-described Equation (1). For example, instead of the above-described Equation (1), the threshold value setting unit 16 may set the steering torque threshold value by an existing method such as linear interpolation of a map value using a map with which the steering torque threshold value is directly calculated using at least one of the longitudinal acceleration, the lateral acceleration, and the vertical acceleration as an argument.

With regard to the aspect of change of the threshold value setting parameter (steering torque threshold value), the continuously decreasing aspect as illustrated in FIGS. 6A to 6C and the stepwise decreasing aspect as illustrated in FIG. 10A to FIG. 10C may be combined with each other.

In the embodiment described above, as a use of the result of determination by the steering determination device 50, the autonomous driving system 100 is exemplified, which performs the manual-driving switching control based on the steering torque for the vehicle of which the driving mode can be switched from the autonomous driving to the manual-driving, but not limited thereto. As the application of the result of determination by the steering determination device 50, for example, the result of determination of the driver's steering state may be applied to a notification to the driver, may be applied to a control other than the manual-driving switching control in the autonomous driving, or may be applied to a control such as a driving assistance other than the autonomous driving.

In the embodiment described above, the function of the steering determination device 50 and the function of the autonomous driving system 100 are integrally configured in the common ECU 10, but may be respectively configured in separate ECUs.

In the embodiment described above, the torque recognition unit 15 recognizes the absolute value of the torsion torque of the steering shaft 22 detected by the torque sensor 5 as the steering torque, but the torsion torque of the steering shaft 22 detected by the torque sensor 5 may be recognized as a positive or negative valued steering torque.

In the embodiment described above, the torque recognition unit 15 recognizes the steering torque using the detection value detected by the torque sensor 5 (the torsion torque of the steering shaft 22), however, a torque estimation value with a compensation of a disturbance included in the detection value detected by the torque sensor 5 may be used as the steering torque among the steering torques from the steering wheel 21. The disturbance may include at least one of inertia, viscosity, friction and the torque from the rack and pinion mechanism 25.

The manual-driving switching control may not necessarily need to be performed when notifying the driver of "approach of the vehicle to the switching location". For example, if there is an operation by the driver to cancel the autonomous driving (for example, an operation of pressing the autonomous driving cancel button) or if there is a brake pedal depression operation by the driver equal to or greater than a certain amount, it may be regarded by the manual-driving switching unit 18 that the driver indicates the intention of manual-driving. In this case, when the driver is notified that the driving mode can be switched to the manual-driving based on the steering operation and when it is determined by the steering determination unit 17 that the driver is in the steering state by the driver's steering operation in response to the notification, the manual-driving switching unit 18 may perform the manual-driving switching control.

In the embodiment described above, the steering shaft 22 is provided so as to be inclined downward as illustrated in FIG. 4B, but for example, the inclination angle of the steering shaft 22 can be changed by a known tilt mechanism. In this case, since the component force $F_{B2}$ and $F_{C2}$ change according to the inclination angle, the threshold value setting unit 16 may correct the steering torque threshold value according to an angle formed by the axis of the steering shaft 22 with respect to the vehicle longitudinal direction. For example, the threshold value setting unit 16 may calculate the vertical threshold value setting parameter such that the vertical threshold value setting parameter decreases as the angle formed by the axis of the steering shaft 22 with respect to the vehicle longitudinal direction increases. The threshold value setting unit 16 may calculate the longitudinal threshold value setting parameter such that the vertical threshold value setting parameter decreases as the angle formed by the axis of the steering shaft 22 with respect to the vehicle longitudinal direction decreases.

Figure 11:
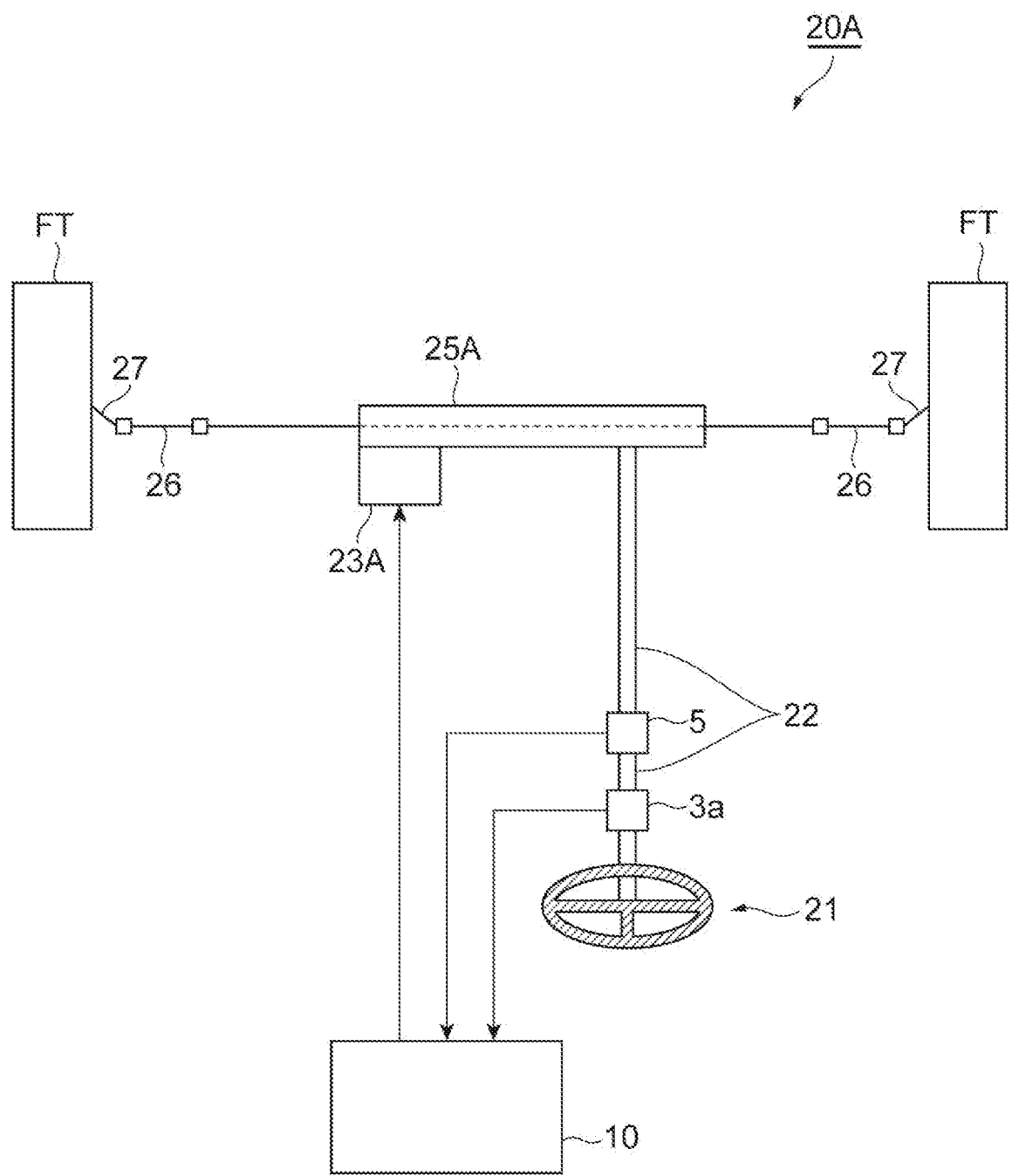
FIG. 11 is a schematic configuration diagram illustrating another example of the steering device.

In the embodiments described above, the steering device 20 illustrated in FIG. 2 is described as an example, but the configuration of the steering device is not limited to the configuration in FIG. 2. For example, as illustrated in FIG. 11, the steering device may be configured as a steering device 20A that includes an EPS motor 23A that applies assist torque to the steering rod or pinion rod of rack and pinion mechanism 25A instead of the EPS motor 23 that applies an assist torque to the steering shaft 22. In this configuration also, the steering operation torque due to the driver's steering operation and the rotation torque due to the acceleration acting on the vehicle can be included in the torque from the steering wheel 21.

Figure 12:
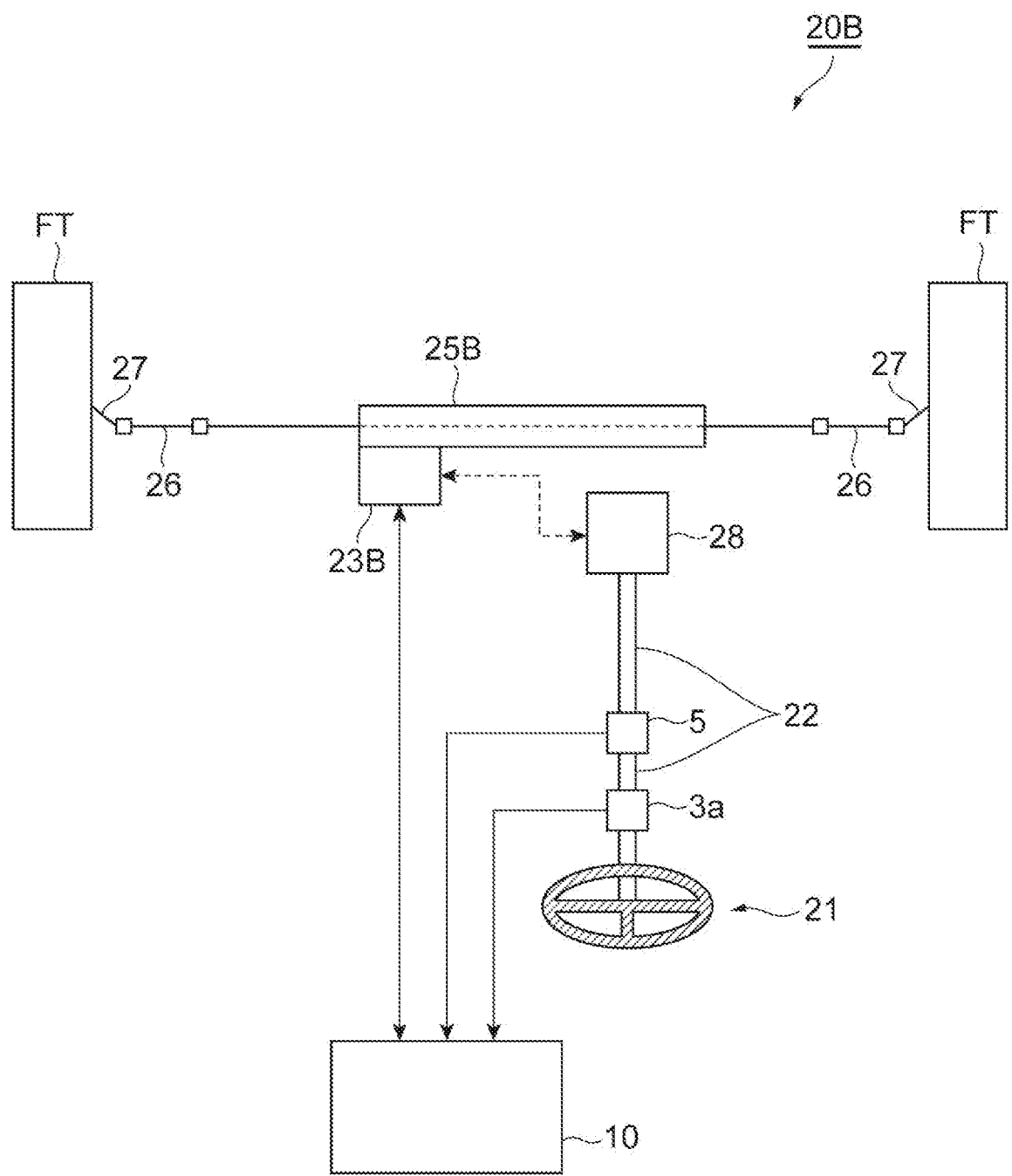
FIG. 12 is a schematic configuration diagram illustrating still another example of the steering device.

In addition, as illustrated in FIG. 12, the steering device may be configured as a steering device 20B (so-called a steer-by-wire) which includes an EPS motor 23B that applies the assist torque to the steering shaft of a ball screw mechanism 25B and in which a reaction force actuator 28 simulating a reaction force from the road surface is connected to the steering shaft 22, instead of the EPS motor 23 that applies the assist torque to the steering shaft 22. This configuration is different from the steering device 20 in that the steering shaft 22 and the steering shaft 22 of the ball screw mechanism 25B are not physically connected, but other configurations are similar to the steering device 20. Accordingly, in this configuration also, the steering operation torque due to the driver's steering operation and the rotation torque due to the acceleration acting on the vehicle can be included in the torque from the steering wheel 21.

What is claimed is:

1. A steering determination device that determines a steering state in which a driver of a vehicle is steering a steering wheel of the vehicle, based on a steering torque of a steering shaft, the device comprising:
    a torque recognition unit configured to recognize the steering torque based on a result of measurement performed by a torque sensor provided on the steering shaft;
    an acceleration recognition unit configured to recognize longitudinal acceleration in a longitudinal direction of the vehicle or lateral acceleration in a lateral direction of the vehicle based on a result of measurement performed by an accelerator sensor of the vehicle;
    a threshold value setting unit configured to set a threshold value used for a determination of the steering state, based on the longitudinal acceleration or the lateral acceleration; and
    a steering determination unit configured to determine that the driver is in the steering state if the steering torque is equal to or greater than the threshold value,
    wherein the threshold value setting unit is configured to set the threshold value such that the threshold value decreases as an absolute value of the longitudinal acceleration or the lateral acceleration decreases.

2. The steering determination device according to claim 1, wherein the threshold value setting unit is configured to set the threshold value such that the threshold value continuously decreases as the absolute value of the longitudinal acceleration or the lateral acceleration decreases.

3. The steering determination device according to claim 1, wherein the threshold value setting unit is configured to set the threshold value such that the threshold value decreases stepwise as the absolute value of the longitudinal acceleration or the lateral acceleration decreases.

4. The steering determination device according to claim 1, wherein the acceleration recognition unit is configured to further recognize a vertical acceleration in a vertical direction of the vehicle, and
    wherein the threshold value setting unit is configured to set the threshold value such that the threshold value decreases as the absolute value of the longitudinal acceleration or the lateral acceleration decreases if the vertical acceleration does not change.

5. The steering determination device according to claim 1, wherein the acceleration recognition unit is configured to recognize the longitudinal acceleration, the lateral acceleration, and a vertical acceleration in a vertical direction of the vehicle, and
    wherein the threshold value setting unit is configured to set the threshold value such that the threshold value decreases as an absolute value of the vertical acceleration decreases if the longitudinal acceleration and the lateral acceleration do not change.

* * * * *